(12) United States Patent
Yeap

(10) Patent No.: US 7,587,724 B2
(45) Date of Patent: Sep. 8, 2009

(54) KERNEL VALIDATION LAYER

(75) Inventor: Yuen-Pin Yeap, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 568 days.

(21) Appl. No.: 11/181,365

(22) Filed: Jul. 13, 2005

(65) Prior Publication Data

US 2007/0016914 A1  Jan. 18, 2007

(51) Int. Cl.
*G06F 3/00* (2006.01)
*G06F 11/00* (2006.01)
*G06F 7/04* (2006.01)

(52) U.S. Cl. ............................. 719/328; 726/23; 726/26
(58) Field of Classification Search ................. 719/328, 719/330; 726/23, 26
See application file for complete search history.

(56) References Cited

U.S. PATENT DOCUMENTS

| 6,412,071 | B1* | 6/2002 | Hollander et al. ............. 726/23 |
| 6,539,480 | B1* | 3/2003 | Drews ......................... 713/191 |
| 7,231,635 | B2* | 6/2007 | Schwabe ..................... 717/126 |
| 7,263,718 | B2* | 8/2007 | O'Brien et al. ................. 726/6 |
| 2005/0033980 | A1* | 2/2005 | Willman et al. ............. 713/200 |
| 2005/0102578 | A1* | 5/2005 | Bliss et al. ..................... 714/38 |
| 2005/0108562 | A1* | 5/2005 | Khazan et al. .............. 713/200 |
| 2006/0090193 | A1* | 4/2006 | Johnson et al. ................. 726/1 |

OTHER PUBLICATIONS

Sun, Trusted Solaris Developer's guide, Nov. 2001.*

* cited by examiner

*Primary Examiner*—Lechi Truong
(74) *Attorney, Agent, or Firm*—Gunnison, McKay & Hodgson, L.L.P.; Serge J. Hodgson

(57) ABSTRACT

Systems and method of computer security are provided. In one implementation, a method is provided. The method includes monitoring incoming kernel mode calls and identifying a kernel mode call to verify using a predetermined criterion. The method also includes validating the identified kernel mode call, and processing the kernel mode call in accordance with the results of the validation of the kernel mode call. In another implementation a kernel application programming interface validation device is provided. The kernel application programming interface validation device includes a monitoring engine for monitoring incoming kernel mode calls, an analysis engine operable to examiner kernel mode calls, a validation engine operable to determine if a kernel mode call is valid using the results of the analysis engine, and a processing engine.

17 Claims, 4 Drawing Sheets

KERNEL VALIDATION LAYER

BACKGROUND

The present invention relates to computer security.

Conventional computing systems include a user mode for providing user interaction with the computing system. The computing system can include a number of applications that can be interacted with by a user using, for example, a user interface. The user can direct the application to perform various functions. For example, a user selection of a particular function in an application can result in a system call to an application programming interface ("API") associated with the application in order to initiate a process for executing the selected function. The functions can be performed in a user portion ("user mode") or can require access to a kernel portion ("kernel mode"), a more secure level of the computing system that includes the core operating system. A function running in the kernel mode can execute all instructions and have access to all the system resources, including physical memory, input/output ports and other physical resources. In contrast, a function running in the user mode can access a smaller subset of instructions and a virtual memory that belongs to the user space. For example, functions such as opening a file or saving a file to memory require access to the computing system hardware (e.g., a hard disk drive or other memory device), which is only accessible through the kernel mode. Thus, for example, an open file call typically progresses from a user mode API to a kernel mode API. The kernel mode API then provides secure access to the device allowing, for example, access to physical memory address locations for opening a file.

Typically, application programmers do not have access to the source code of a user mode API. However, programmers can design programs to extend the functionality of the user mode API, using for example known hooks associated with the API. Conventionally, the applications are installed using an API interception (or API hooking) technique. Calls to or from the user mode API can be intercepted by an API interception application and additional functions performed prior to returning the call to the intended destination path. For example, a third party application such as a security system can install an API hook to intercept particular system calls from applications in order to determine whether or not the process has been affected by malicious software, commonly referred to as malware, including spyware, Trojans, viruses and other harmful code. The security system can then allow the call to continue (e.g., to the kernel mode) if the call passes one or more security checks. Intercepted calls which fail the security check(s) can be terminated.

Malicious software can be designed to circumvent security systems based on API hooking. For example, the malicious software can be designed to bypass the hook of the security system by calling the kernel API directly using an interrupt call or by inserting a jump command into the call thread prior to the hook in order to bypass the security system API hook.

SUMMARY

In general, in one aspect, a method is provided. The method includes monitoring incoming kernel mode calls and identifying a kernel mode call to verify using a predetermined criterion. The method also includes validating the identified kernel mode call, and processing the kernel mode call in accordance with the results of the validation of the kernel mode call.

Advantageous implementations can include one or more of the following features. The method can further include analyzing the identified kernel mode call. The analyzing can further include examining the kernel mode call to identify previous steps in the kernel mode call thread. The examination of the kernel mode call can identify a prior interception of the kernel mode call. The analyzing can further include searching the kernel mode call thread for one or more security features and validating the kernel mode call if the security features are found, identifying a source library of the kernel mode call, and comparing the identified source library with one or more allowed source libraries. The kernel mode call can be invalidated if the source library is not an allowed source library.

The processing can further include transmitting the kernel mode call to a kernel mode application programming interface if the kernel mode call is validated and otherwise processing a non-validated kernel mode call. The otherwise processing can include terminating the kernel mode call, generating an alert, and logging the non-validated kernel mode call. The verifying can further include matching a security feature in the kernel mode call with a reference security feature, and validating the kernel mode call if the security feature matches the reference security feature. The monitoring incoming kernel mode calls can further include monitoring for particular types of kernel mode calls and intercepting all incoming kernel mode calls.

In general, in one aspect, an apparatus is provided. The apparatus includes a kernel application programming interface validation device. The kernel application programming interface validation device includes a monitoring engine for monitoring incoming kernel mode calls, an analysis engine operable to examine kernel mode calls, a validation engine operable to determine if a kernel mode call is valid using the results of the analysis engine, and a processing engine.

In general, in one aspect, a computer system is provided. The computer system includes a user portion and a kernel portion. The user portion includes one or more user applications, a user mode application programming interface; and one or more user mode application programming interface interception applications. The kernel portion includes a kernel mode application programming interface, and a kernel application programming interface validation device. The kernel application programming interface validation device is operable to monitor incoming kernel mode calls to the kernel mode from the user mode application programming interface, analyze and validate the kernel mode calls, and process the kernel mode calls.

In general, in one aspect, a computer program product is provided. The computer program product includes instructions to monitor incoming kernel mode calls, identify a kernel mode call to verify, analyze the identified kernel mode call, validate the identified kernel mode call according to the analysis, and process the kernel mode call according the validation of the kernel mode calls.

The invention can be implemented to realize one or more of the following advantages. Kernel mode calls can be monitored and analyzed in order to protect against malicious software. A kernel validation layer can be installed to intercept all incoming system calls from the user mode to the kernel mode. The kernel validation layer can monitor all system calls or particular system calls targeting a kernel mode API. System calls can be analyzed to validate the authenticity and integrity of the call. The kernel validation layer can validate the incoming call by verifying that the call had been intercepted by a security system. Thus, calls which have been redirected to bypass an API interception for security purposes can be blocked at the kernel validation layer. Additionally, the kernel validation layer can also validate an incoming call by examining a source library of the call as well as the stack history of the call thread.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Architecture

Figure 1:
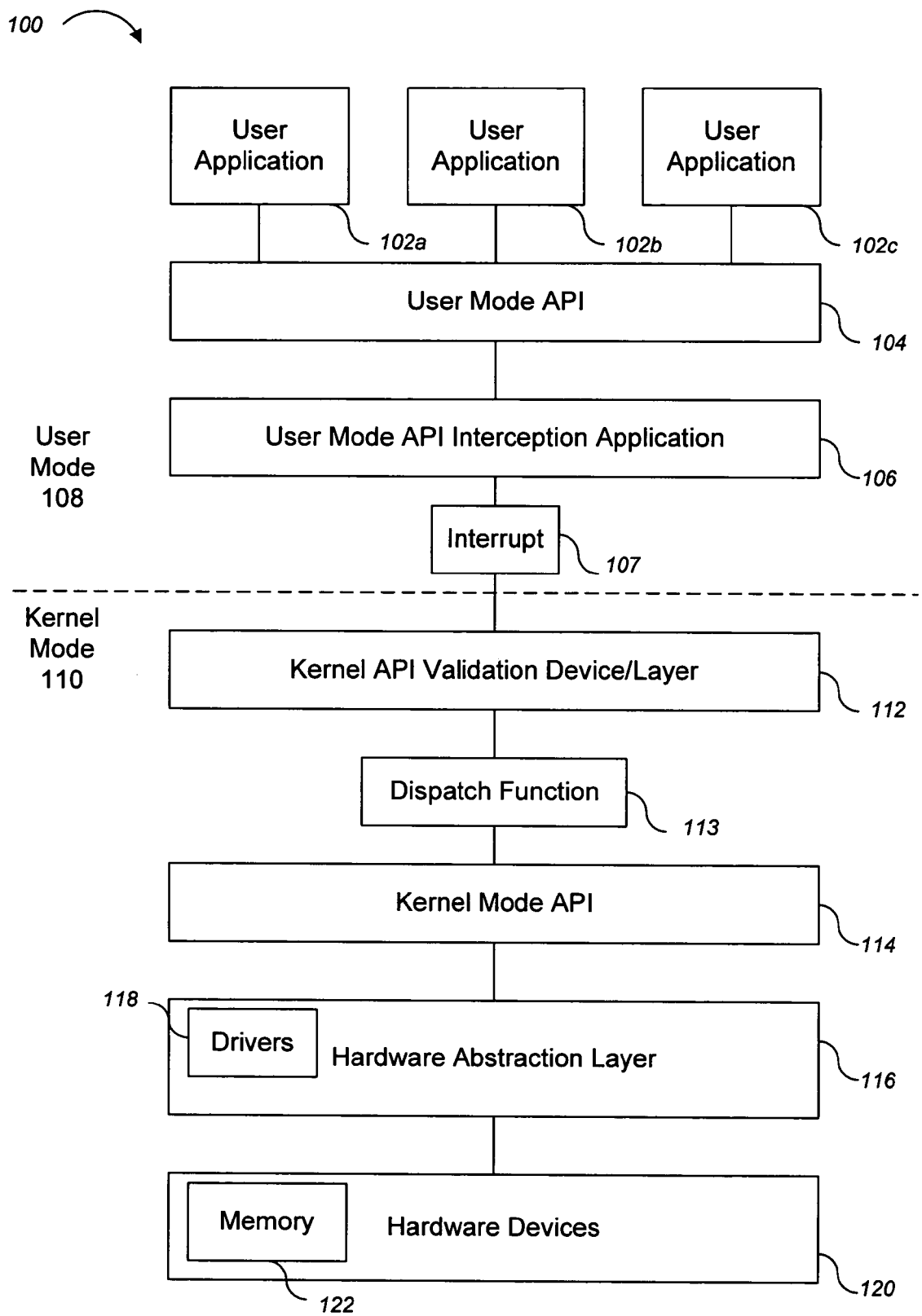
FIG. 1 is a functional block diagram of a computing system.

FIG. 1 illustrates a functional block diagram of a computing system 100. The computing system 100 can be divided into a user portion ("user mode") 108 and a kernel portion ("kernel mode") 110. In one implementation, the operating system of the computing system 100 resides in the kernel mode 110. The user mode 108 can include, for example, user applications 102a, 102b, and 102c, which can be directly accessed or modified by a user. In contrast, the kernel mode 110 can be a secure layer of the computing system 100 that cannot be directly accessed by a user.

The user mode includes user applications 102a, 102b, and 102c, a user mode API 104, and one or more user mode API interception applications 106. The user applications 102a-102c can include applications accessible by a user for performing different functions on the computing system. For example, the user applications 102a-c can include word processing, database management, email applications, and any other user managed applications. The user applications 102a-102c can provide different functionality in response to user input. For example, in a word processing application a user can open a file, create a new file, and save a file in response to user input.

To provide the requested functions, the user applications 102a-c can generate one or more different system calls which can be transmitted to the user mode API 104. Some examples of system calls include calls to open a file, create a process, load a library, terminate a process, open a registry key, and perform other functions. For example, the user of a word processing program can request the user application 102 to provide (e.g., open) a particular saved file. The user application 102 can transmit an open file call to the user mode API 104 in response to the user request.

The user mode API 104 is an interface through which the user applications 102a-c can access the operating system and other kernel mode 110 resources of the computing system 100. In one implementation, the user mode API 104 includes a number of different libraries (e.g. .dll files) which can be used to initially process a call received from a particular user application 102 (e.g., an open file call). In another implementation, some of the calls to the user mode API 104 can be completed in user mode 108 without resources from the kernel mode 110. For example, some functions can access information within the user mode 108 such as a "get current process" function that retrieves an identifier of a calling process without accessing the kernel mode 110.

Other calls to the user mode API 104, may require other (e.g., kernel) resources in order to provide the user requested function. In one implementation, the user mode API 104 is not allowed to directly access the kernel of the operating system. An interrupt 107 can be associated with the user mode API 104 and used to access higher security process levels. Thus, in one implementation the user mode API 104 can act as a gateway to the kernel mode API 114 allowing the functionality of the kernel mode 110 to be isolated from the user mode 108 such that all calls to the kernel mode 110 require an interrupt triggered by the user mode API 104.

For example, when a user application 102 sends a "Create File" call to the user mode API 104, the call initially points to one or more libraries where the user mode API 104 can perform some initial processing associated with the create file request. In one implementation, because the create file call requires one or more system resources (e.g., kernel mode 110 resources) an interrupt 107 can be generated. The interrupt 107 can include instructions (e.g., a system call such as "SYSCALL") to access a privileged kernel function. Thus, the interrupt 107 allows the call to transfer from the user mode API 104 to the kernel mode 110. After switching into the kernel mode 110, the accessed kernel function can look up the correct pointer (e.g., using a service table) and call a corresponding function associated with the kernel mode API 112 for executing the create process call. The kernel mode 110 call can then perform the work to create a new file.

User Mode API interception applications 106 can include one or more different interception applications used to provide additional functionality to the computing system 100. For example API interception applications 106 can include functionality to provide operating system lockdown, behavior analysis, data encryption, access cataloging, profiling and other services. In one implementation, the API interception applications 106 can monitor calls into or from the user mode API 104. In one implementation, the API interception application 106 intercepts system calls leaving the user mode API 104. The API interception application 106 can then intercept all user mode call threads directed to the kernel mode API 114.

In one implementation, the API interception applications 106 can each inject a hook to monitor for, and redirect one or more particular calls which the hook is monitoring for. For example, the hook may intercept particular types of calls while allowing other calls to pass. If a hook for a particular API interception application 106 identifies a call which the hook is monitoring for, the hook can cause the call to be redirected to the API interception application 106. The API interception application 106 can then perform one or more functions on the call prior to returning the call back to the call's original destination path.

More specifically, in one implementation, the hook can be injected into machine instructions for one or more particular types of calls. The hook can then modify the machine instructions associated with that call type. When a hooked call is being processed by the machine instructions, the hook modified instructions are executed in place of the original instructions. In one implementation, the hook inserts a jump command that points to the API interception application 106. The jump command is a pointer that redirects the call to the API interception application 106. The API interception application 106 can include instructions corresponding to one or more functions to be performed. For example, in one implementation, the API interception application 106 is part of a security system. The security system can monitor one or more specific types of calls for malicious software such as spyware, viruses, Trojans, or other malicious code, which can harm the computing system 100. The security system can examine intercepted calls to prevent the malicious software from being transported into the kernel layer using the call command.

In one implementation, the call can be initiated by malicious software. For example, malicious software installed on the computing system 100 can generate calls which mimic legitimate calls to the kernel mode API 114 in order to infiltrate the secure kernel mode 110. In another implementation, the malicious software could be the result of an interception by malicious software of a legitimate call directed to the kernel mode API 114. For example, the malicious software can be used to generate an API interception application (not shown) that hooks into one or more calls prior to the hook of security system API interception application 106. The call can then be redirected to the malicious software application where the malicious software can perform one or more functions on the call causing the call to perform functions for the malicious software upon entering the kernel mode 110.

Upon interception of the call by the API interception application 106, an analysis of the call by an analysis routine (not shown) of the API interception application 106 can include analyzing the history call thread. The call thread can be examined to identify the past steps or functions performed since the origin of the call as well as the source of the call. The API interception application 106 can use the analysis routine to identify any tampering or illegitimate sources associated with the call thread, such as a suspicious source or interception of the call. In one implementation, if malicious software, or the effects of malicious software, is detected by the analysis routine, the call can be terminated. Alternatively, the malicious software can be removed from the call thread by a cleaning routine (not shown) in order to allow a clean legitimate call to proceed. Furthermore, discovery of the malicious software can trigger an action to identify and remove the source of the malicious software by the cleaning routine.

In one implementation, if there are no threats identified in the call process by the analysis routine, or if an identified threat has been removed by the cleaning routine, the API interception application 106 can insert a security feature such as a digital stamp or signature using a securing routine (not shown). The security feature indicates that the call has been examined and has cleared the API interception application 106. The digital stamp or signature can be encrypted or otherwise protected from tampering. In another implementation, a cookie can be inserted into the call indicating that the call has cleared the API interception application 106.

Finally, an additional jump command or other pointer can be used by the user mode API interception application 106 to redirect the call back to the process flow of machine instructions. In one implementation, a jump command following the processes of the API interception application 106 returns the call process back to the instruction list at a point below the first jump command that sent the call process to the API interception application 106. In one implementation, the jump command points the call to the interrupt for transferring the call to the kernel mode API 114.

The kernel mode 110 includes a kernel API validation layer 112, a kernel mode API 114, a hardware abstraction layer 116, and hardware devices 120. The hardware devices 120 can include the physical devices for operating the computer system 100. The hardware devices 120 can include storage devices such as memory 122, processing devices, and other input/output devices. In one implementation, the kernel API validation layer 112 can be provided as a kernel API validation device 112. The kernel API validation device 112 can be a hardware device installed on the computing system 100 to perform the same functions as the kernel API validation layer 112.

The hardware abstraction layer 116 allows different software to be device-independent by abstracting information from systems such as caches, I/O buses, and interrupts and using hardware data to provide applications 102 a way to interact with the specific requirements of the hardware devices 120 on which the application 102 or portion thereof is running/interacting, etc. In one implementation, the hardware abstraction layer 116 includes drivers 118 that can be used to control the hardware devices by providing access to registers of hardware devices.

The kernel mode API 114 is a part of the operating system of the computing system 100 operating in kernel mode 110. In one implementation, the kernel mode API 114 is a secure API capable of accessing different kernel resources, for example kernel objects such as mutex, semaphore, or the file system. The kernel mode API 114 is accessed through an interrupt 107 generated from the user mode API 104. The interrupt 107 transfers control to a set of privilege instructions providing access to the kernel mode 110. An interrupt 107 providing access to the kernel mode 110 can include a system call instruction, a trap gate, an interrupt gate, and a call gate. In one implementation, the user mode API 104 calls into the kernel mode API 114 by identifying a kernel mode call corresponding to the received user mode API call.

The kernel API validation layer 112 lies in the kernel mode 110 between the user mode API 104 and the kernel mode API 114. In one implementation, the kernel API validation layer 112 intercepts each incoming call from the user mode 108 into the kernel mode API 114. The kernel API validation layer 112 can intercept each call into the kernel mode API 114 in order to verify that the calls are legitimate.

In one implementation, the kernel API validation layer 112 can be inserted into the secure process using, for example, a shim driver. A shim is a piece of code placed between layers, or groups of hierarchical functions. Thus, the shim driver provides for the kernel API validation layer 112 between the layers of the user mode API 104 and the kernel mode API 114. When a particular call transitions from the user mode 108 to the kernel mode 110, a kernel mode dispatch function 113 calls the native kernel API function from a service table containing all kernel API addresses. The corresponding call is then placed into the kernel mode API 114 in order to perform the desired function. In one implementation, the shim driver can be used to replace the original service table function pointers with one or more function pointers. As a result, the driver shim functions are called first from the service table. In one implementation, the replaced service table function pointers can point to the kernel API validation layer 112 for performing validation functions. In an alternative implementation, the kernel API validation layer 112 can be inserted into the kernel mode 110 using different techniques. For example, the system call dispatch function can be hooked or the software interrupt call can be hooked. Regardless of the insertion technique, the kernel API validation layer 112 can monitor, intercept, and process some or all of the incoming kernel mode calls.

Figure 2:
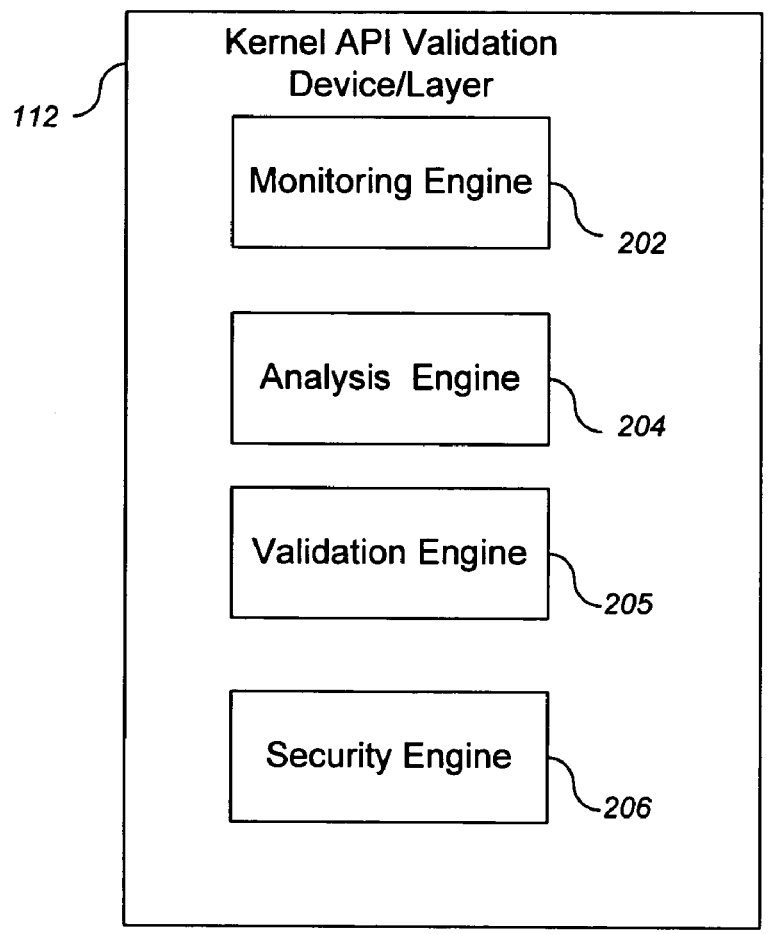
FIG. 2 is a block diagram of a kernel validation layer.

FIG. 2 shows a block diagram of an API validation layer 112. In one implementation, the API validation layer 112 includes a monitoring engine 202, an analysis engine 204, a validation engine 205, and a processing (security) engine 206 The monitoring engine 202 can monitor incoming kernel mode calls. In one implementation, the monitoring engine 202 monitors for particular types of system calls. For example, certain types of calls may be considered to be of higher risk to a system then others (e.g., a create process call can be designated as having a higher risk than other call types). Other types of system calls can be more susceptible to tampering then others.

The analysis engine 204 examines calls which have been identified by the monitoring engine 202. The analysis engine 204 can examine the call to identify the previous operations performed from the point at which the call was first initiated. For example, the analysis engine 204 can perform a stack backtracking to identify previous steps in the call history. If a step in the call thread is suspect, further analysis can be performed or the call can be terminated. In one implementation, the analysis engine 204 can also examine the origin of the call to the kernel mode API 114. Kernel mode calls can only be legitimately performed through particular operating system libraries. The analysis engine 204 can also examine the call to identify any security features placed in the call, for example, by a user mode API interception application 106 that performs security functions. Upon identifying a security feature, the analysis engine 204 can examine the security feature to determine whether or not the security feature is recognized as authentic.

In another implementation, the analysis engine 204 can analyze the call for an indication that the call has been previously analyzed by a user mode security system. For example, the analysis engine 204 can examine the call for a security feature such as a stamp or signature indicating that the call cleared a security analysis performed by a user mode API interception application 106. In one implementation, the stamp, signature, or other security feature placed within the call can be encrypted or otherwise secured against tampering.

The validation engine 205 can validate or invalidate the call according to the analysis of the analysis engine 204. In one implementation, if the analysis engine 204 determines that a step in the call thread is suspect, the call can be invalidated by the validation engine 205. Additionally, if the analysis of the call determines that the call did not originate from one of the allowed libraries, the call can be invalidated by the validation engine 205. Furthermore, the validation engine can validate the call based on an identified security stamp or other feature placed into the call. For example, the user mode API interception application 106 can compare a security stamp or signature with one or more stored security features to determine the validity of the stamp or signature. In one implementation, if the call has been validated by the user mode API interception application 106, then the validation engine 205 can also validate the call. In one implementation, if a security feature is not found in the call thread, malicious software may have caused the call to bypass the security system.

The processing engine 206 can operate on the call according to the results of the analysis and validation engine 205. In one implementation, if the call is validated, the call can proceed to the kernel mode API 114 as originally directed. In another implementation, if the call is not validated, the call can be denied and/or otherwise processed. Otherwise processing can include logging the invalidated call or alerting a security system. In one implementation, the call process can be terminated or otherwise blocked from proceeding.

Operation

Figure 3:
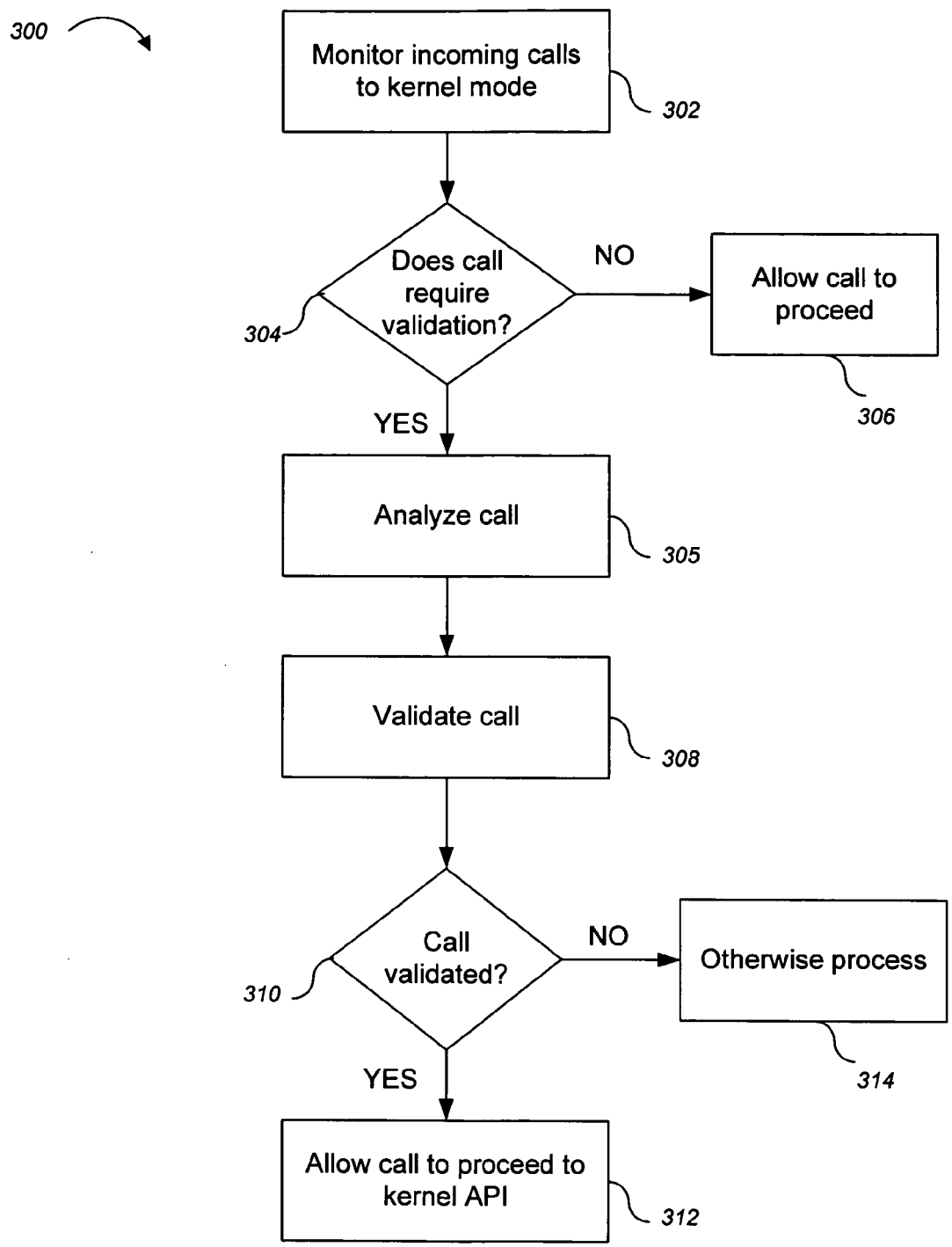
FIG. 3 is a process for kernel validation.

FIG. 3 shows a process 300 for validating kernel mode calls. Incoming calls directed to a kernel mode API (e.g., kernel mode API 114) are monitored (e.g., by monitoring engine 202 of the kernel API validation device/layer 112) (step 302). In one implementation, all incoming kernel mode calls are intercepted and routed to the kernel API validation layer. In another implementation, only particular types of calls are routed to the kernel API validation layer. Particular call types can be predetermined as calls to intercept. Additionally, in one implementation, all calls are routed through the kernel API validation layer, but only particular types of calls are selected for validation. For example, the monitoring engine can be designed to monitor for and identify calls that have been designated for validation because they can be considered to have a higher risk of infection or modification by malicious software. The higher risk calls can be subject to validation while the other calls are allowed to proceed directly to the kernel mode API.

The monitoring engine can monitor the incoming kernel mode calls to determine whether or not a particular incoming call requires validation (step 304). In one implementation, if a particular call does not require verification, the call is allowed to proceed (e.g., to the kernel mode API 114) (step 306). In another implementation, all incoming kernel mode calls require validation.

If a call requires validation, the kernel mode call is first analyzed by an analysis engine (e.g., analysis engine 204) (step 305). In one implementation, the analysis performed by the analysis engine includes examining the thread history of the call using stack backtracking. The past operations in thread of the call can be examined (e.g., by analysis engine 204) to identify any actions indicating that an unauthorized interception has taken place. The analysis engine can also examine the threat history of the call to determine whether or not the call was properly intercepted by a security system (e.g., by a user mode API interception application 106 functioning as part of a security system).

In another implementation, the analysis engine can examine the origin of the call. The analysis engine can determine whether or not the call originated from one or more allowed libraries. In one implementation, only particular allowed libraries in the user mode API are allowed to directly call into the kernel mode API. Additionally, the analysis engine can examine the call thread for one or more security features installed by a security device such as a user mode API interception application.

Following the analysis, the call can be validated or invalidated (e.g., by validation engine 205) (step 308). If the call is validated, the call is allowed to proceed to the kernel mode API (step 312). The validation process can include determining if the call originated from a legitimate library. Validation can also include determining whether the call thread history indicates tampering or other indications that the call has been tampered with. Additionally, the validation process can include verifying the authenticity of one or more security features located in the call thread.

In one implementation, the validation engine can verify the encoding of a security feature or match the security feature to a stored security feature. In one implementation, a security feature is required such that if no security feature is found by the analysis engine or if the security feature can not be verified, the validation process fails. For example, a kernel API validation layer can be designed to work with one or more user mode security systems. Consequently, the API validation layer can be designed to identify particular security features in the call thread indicating that the call has been processed by the security system.

If the call is not validated, the call can be otherwise processed (e.g., by processing engine 206) (step 314). Otherwise processing can include terminating the call, generating an alert, and logging the non-validated call. In one implementation, non-validated calls are only logged and then allowed to proceed. In one implementation, an alert is generated to a security system which can then alert a user to the potential malicious software infection. The security system can also be alerted in order to perform an analysis or scan of the computing system 100 in order to identify the source of the malicious software that affected the system call. In another implementation, the call can be terminated and the monitoring engine can be notified such that any further detected calls of the same call type are also terminated. Additionally, the source caller of the call can be terminated to prevent further calls.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 4:
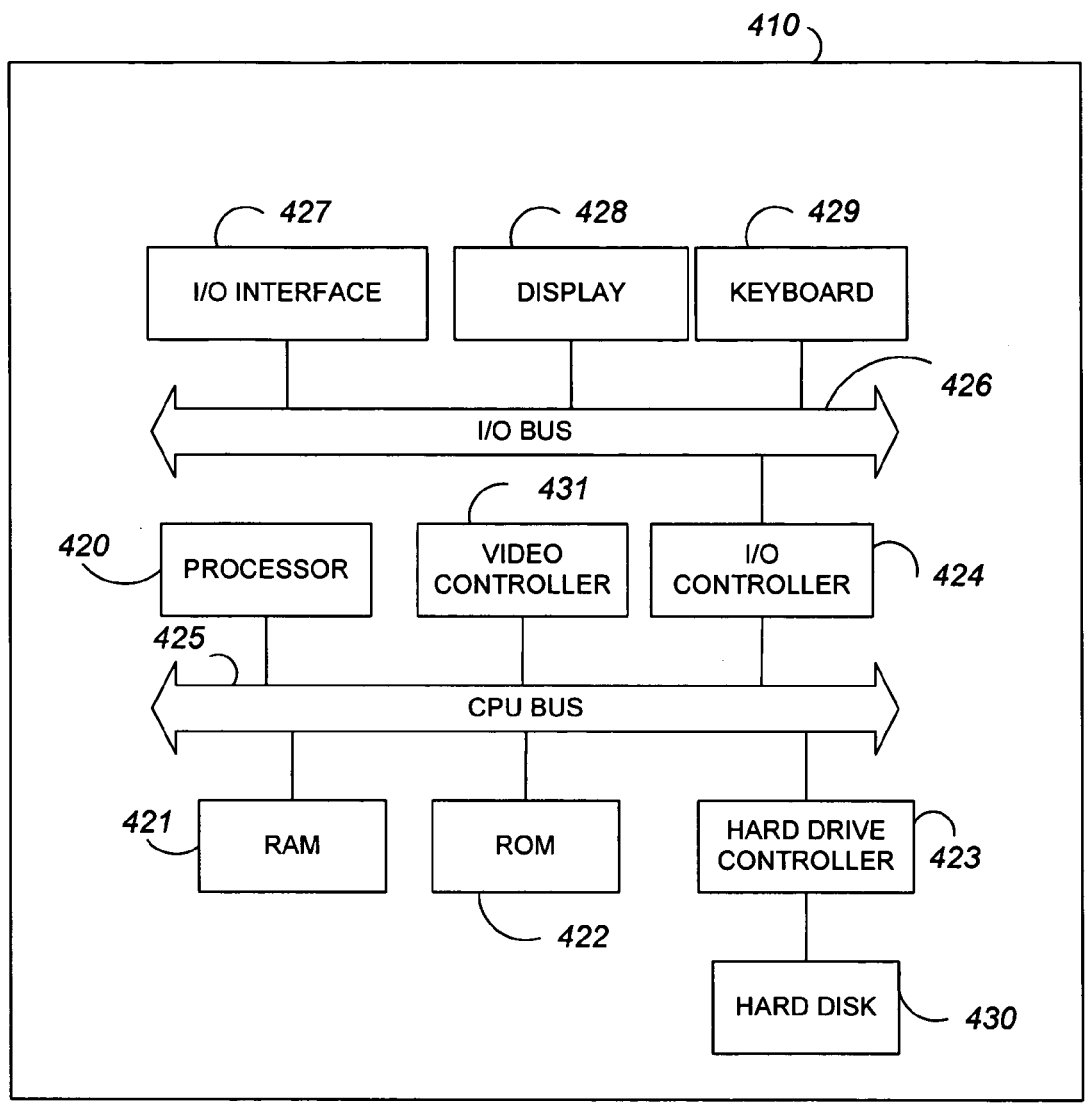
FIG. 4 is a block diagram of a computer system.

An example of one such type of computer is shown in FIG. 4 which shows a block diagram of a programmable processing system (system) 410 suitable for implementing or performing the apparatus or methods of the invention. The system 410 includes a processor 420, a random access memory (RAM) 421, a program memory 422 (for example, a writable read-only memory (ROM) such as a flash ROM), a hard drive controller 423, a video controller 431, and an input/output (I/O) controller 424 coupled by a processor (CPU) bus 425. The system 410 can be preprogrammed, in ROM, for example, or it can be programmed (and reprogrammed) by loading a program from another source (for example, from a floppy disk, a CD-ROM, or another computer).

The hard drive controller 423 is coupled to a hard disk 430 suitable for storing executable computer programs, including programs embodying the present invention, and data.

The I/O controller 424 is coupled by means of an I/O bus 426 to an I/O interface 427. The I/O interface 427 receives and transmits data (e.g., stills, pictures, movies, and animations for importing into a composition) in analog or digital form over communication links such as a serial link, local area network, wireless link, and parallel link.

Also coupled to the I/O bus 426 is a display 428 and a keyboard 429. Alternatively, separate connections (separate buses) can be used for the I/O interface 427, display 428 and keyboard 429.

The invention has been described in terms of particular embodiments. Other embodiments are within the scope of the following claims. For example, the steps of the invention can be performed in a different order and still achieve desirable results. Additionally, implementations can be tailored for different types of operating systems including Windows OS, LINUX, and UNIX.

What is claimed is:

1. A method, comprising:
  monitoring on a processor incoming kernel mode calls;
  identifying a kernel mode call of the kernel mode calls to verify using a predetermined criterion;
  validating the identified kernel mode call in a kernel mode comprising:

searching the kernel mode call for a security feature inserted by a user mode application programming interface interception application in a user mode, wherein the user mode application programming interface interception application inserts the security feature upon determining that the kernel mode call is clear of malicious code; and validating the kernel mode call if the security feature is found;

processing the kernel mode call in accordance with results of the validation of the kernel mode call, wherein a user application in the user mode generates a system call into a user mode application programming interface in the user mode, wherein the user mode application programming interface processes the system call and generates the kernel mode call;

intercepting the kernel mode call with the user mode application programming interface interception application; and inspecting the kernel mode call for the malicious code with the user mode application programming interface interception application in the user mode, wherein upon a determination that the kernel mode call comprises the malicious code, the method further comprising:

terminating the kernel mode call with the user mode application programming interface interception application; and wherein upon the determining that the kernel mode call is clear of malicious code and after the security feature is inserted, the method further comprising:

transferring the kernel mode call from the user mode application programming interface interception application to the kernel mode.

2. The method of claim 1, farther comprising:
analyzing the identified kernel mode call.

3. The method of claim 2, where the analyzing further comprises:
examining the kernel mode call to identify previous steps in a kernel mode call thread.

4. The method of claim 3, where the examination of the kernel mode call identifies a prior interception of the kernel mode call.

5. The method of claim 2, where the analyzing further comprises:
identifying a source library of the kernel mode call; and
comparing the identified source library with one or more allowed source libraries.

6. The method of claim 5, where the kernel mode call is invalidated if the source library is not an allowed source library.

7. The method of claim 1, where the processing further comprises:
transmitting the kernel mode call to a kernel mode application programming interface if the kernel mode call is validated.

8. The method of claim 1, where the processing further comprises:
otherwise processing a non-validated kernel mode call.

9. The method of claim 8, where otherwise processing includes terminating the kernel mode call.

10. The method of claim 8, where otherwise processing includes generating an alert.

11. The method of claim 8, where otherwise processing includes logging the non-validated kernel mode call.

12. The method of claim 1, where the validating the kernel mode call if the security feature is found further comprises:

matching the security feature in the kernel mode call with a reference security feature; and validating the kernel mode call if the security feature matches the reference security feature.

13. The method of claim 1, where monitoring incoming kernel mode calls further includes monitoring for particular types of kernel mode calls.

14. The method of claim 1, where monitoring incoming kernel mode calls includes intercepting all incoming kernel mode calls.

15. An apparatus, comprising:
a processor;
a kernel application programming interface validation device, including:
a monitoring engine for monitoring on the processor incoming kernel mode calls and identifying the kernel mode calls, the kernel mode calls are identified by using a predetermined criterion;
an analysis engine operable to examine the identified kernel mode calls for a security feature inserted by a user mode application programming interface interception application in a user mode, wherein the user mode application programming interface interception application inserts the security feature upon determining that the kernel mode calls are clear of malicious code;
a validation engine operable to determine if a kernel mode call of the kernel mode calls is valid using results of the analysis engine comprising validating the kernel mode call if the security feature is found by the analysis engine; and
a processing engine operable to process the kernel mode call in accordance with results of the validation of the kernel mode call;
a user application in the user mode for generating a system call into a user mode application programming interface in the user mode, wherein the user mode application programming interface is for processing the system call and generating the kernel mode call;
the user mode application programming interface interception application further for intercepting the kernel mode call;
the user mode application programming interface interception application further for inspecting the kernel mode call for the malicious code in the user mode, wherein upon a determination that the kernel mode call comprises the malicious code, the user mode application programming interface interception application further for terminating the kernel mode call; and
wherein upon the determining that the kernel mode call is clear of malicious code and after the security feature is inserted, the user mode application programming interface interception application farther for transferring the kernel mode call to the kernel mode.

16. A computer system comprising:
a memory;
a user portion, including:
one or more user applications,
a user mode application programming interface; and
one or more user mode application programming interface interception applications for inserting a security feature into kernel mode calls upon determining that the kernel mode calls are clear of malicious code; and
a kernel portion, including:
a kernel mode application programming interface, and
a kernel application programming interface validation device operable to execute instructions in the memory to:

monitor incoming kernel mode calls to the kernel mode from the user mode application programming interface;

identify the kernel mode calls using a predetermined criterion;

analyze and validate the identified kernel mode calls comprising:

searching the kernel mode calls for the security feature inserted by the user mode application programming interface interception application; and validating the kernel mode call of the kernel mode calls if the security feature is found;

and process the kernel mode call in accordance with results of the validation of the kernel mode call, wherein the one or more user applications for generating a system call into the user mode application programming interface, wherein the user mode application programming interface is for processing the system call and generating the kernel mode call;

the one or more user mode application programming interface interception applications further for intercepting the kernel mode call;

the one or more user mode application programming interface interception applications further for inspecting the kernel mode call for the malicious code, wherein upon a determination that the kernel mode call comprises the malicious code, the one or more user mode application programming interface interception applications further for terminating the kernel mode call; and wherein upon the determining that the kernel mode call is clear of malicious code and after the security feature is inserted, the one or more user mode application programming interface interception applications further for transferring the kernel mode call to the kernel portion.

17. A computer program product, tangibly stored on a machine-readable storage device, comprising instructions executed by a computer to:

monitor on the computer incoming kernel mode calls;

identify a kernel mode call of the kernel mode calls to verify using a predetermined criterion;

analyze the identified kernel mode call;

validate the identified kernel mode call according to the analysis in a kernel mode comprising:

searching the kernel mode call for a security feature inserted by a user mode application programming interface interception application in user mode, wherein the user mode application programming interface interception application inserts the security feature upon determining that the kernel mode call is clear of malicious code; and validating the kernel mode call if the security feature is found;

process the kernel mode call in accordance with results of the validation of the kernel mode call, wherein a user application in the user mode generates a system call into a user mode application programming interface in the user mode, wherein the user mode application programming interface processes the system call and generates the kernel mode call;

intercepting the kernel mode call with the user mode application programming interface interception application; and inspecting the kernel mode call for the malicious code with the user mode application programming interface interception application in the user mode, wherein upon a determination that the kernel mode call comprises the malicious code, the method further comprising:

terminating the kernel mode call with the user mode application programming interface interception application; and wherein upon the determining that the kernel mode call is clear of malicious code and after the security feature is inserted, the method further comprising:

transferring the kernel mode call from the user mode application programming interface interception application to the kernel mode.

\* \* \* \* \*

UNITED STATES PATENT AND TRADEMARK OFFICE
CERTIFICATE OF CORRECTION

PATENT NO.        : 7,587,724 B2  
APPLICATION NO.   : 11/181365  
DATED             : September 8, 2009  
INVENTOR(S)       : Yuen-Pin Yeap Page 1 of 1

It is certified that error appears in the above-identified patent and that said Letters Patent is hereby corrected as shown below:

In Column 11, Line 33, Claim 2, replace "farther" with --further--;
In Column 12, Line 52, Claim 15, replace "farther" with --further--.

Signed and Sealed this

Twenty-ninth Day of December, 2009

David J. Kappos
*Director of the United States Patent and Trademark Office*